United States Patent
Kondo

[11] Patent Number: 5,848,255
[45] Date of Patent: Dec. 8, 1998

[54] METHOD AND APARATUS FOR INCREASING THE NUMBER OF INSTRUCTIONS CAPABLE OF BEING USED IN A PARALLEL PROCESSOR BY PROVIDING PROGRAMMABLE OPERATION DECORDERS

[75] Inventor: Yoshikazu Kondo, Tokyo, Japan

[73] Assignee: Mitsubushi Denki Kabushiki Kaisha, Tokyo, Japan

[21] Appl. No.: 758,452

[22] Filed: Nov. 29, 1996

[30] Foreign Application Priority Data

Jun. 19, 1996 [JP] Japan .................................. 8-158505

[51] Int. Cl.[6] ...................................................... G06F 9/30
[52] U.S. Cl. ............................................. 395/388; 395/391
[58] Field of Search ..................................... 395/388, 391

[56] References Cited

U.S. PATENT DOCUMENTS

| | | | |
|---|---|---|---|
| 5,202,967 | 4/1993 | Matsuzaki et al. ..................... | 395/388 |
| 5,233,694 | 8/1993 | Hotta et al. . | |
| 5,377,339 | 12/1994 | Saito et al. . | |
| 5,408,625 | 4/1995 | Narita et al. ............................ | 395/386 |
| 5,410,659 | 4/1995 | Goto ....................................... | 395/388 |
| 5,627,982 | 5/1997 | Hirata et al. ............................ | 395/382 |

FOREIGN PATENT DOCUMENTS

A 55-124847 of 1980 Japan .

OTHER PUBLICATIONS

"An 80–MFLOPS (Peak) 64–b Microprocessor for Parallel Computer" by Nakano et al, IEEE Journal of Solid State Circuits, Vo. 27, No. 3, pp. 365–372 (1992).

"TP 13.1 A 1.2GFLOPS Neural Network Chip Exhibiting Fast Convergence" Kondo et al, 1994 IEEE INtl. Solid State Circuits Conference.

*Primary Examiner*—Krisna Lim
*Attorney, Agent, or Firm*—Sughrue, Mion, Zinn, Macpeak & Seas, PLLC

[57] ABSTRACT

A method and apparatus for increasing the number of instructions which can be utilized by a parallel processor is provided having a group of programmable decode memories used as an operation decoder. When assembling a source file, a decode memory table showing a correspondence between a plural number of given instruction codes and a plural number of control codes is created simultaneously with an execution file. The plural number of instruction codes are input from outside the parallel processor as address signals and written to the group of decode memories via a multiplexer within the parallel processor. In addition, the plural number of control codes are written into the group of decode memories in accordance with the correspondence to the instruction codes contained in the decode memory table.

12 Claims, 8 Drawing Sheets

Fq: FREQUENCY OF OCCURRENCE OF INSTRUCTION

METHOD AND APARATUS FOR INCREASING THE NUMBER OF INSTRUCTIONS CAPABLE OF BEING USED IN A PARALLEL PROCESSOR BY PROVIDING PROGRAMMABLE OPERATION DECORDERS

BACKGROUND OF THE INVENTION

1. Field of the Invention

The present invention relates to a method of increasing the number of instructions for use in a parallel processor which executes a variety of applications such as an image processing application, a scientific calculation application, and a neural network application, with efficiency, and a parallel processor utilizing the method.

2. Description of the Prior Art

Referring now to FIG. 7, it illustrates a block diagram showing a prior art parallel processor as disclosed in, for example, "80-MFLOPS (peak) 64-bit Microprocessor for Parallel Computer", IEEE Journal of Solid State Circuits, Vol.27, No.3, pp. 365–372 (1992) by Hiraku Nakano et al.. In the figure, reference numeral 10 denotes a pipelined control unit, 11 denotes a program counter, 12 denotes an instruction memory (or an instruction cache), 13 denotes an instruction register, 14 denotes an operation decoder, each of 15 to 18 denotes a control code register, 50 to 53 denote first, second, third, and fourth operation units connected to the control unit 10 in parallel, respectively.

Next, a description will be made as to the operation of the prior art parallel processor. The operation decoder 14 extends an instruction code (i.e., a part of the contents stored in the instruction memory 12) held by the instruction register 13 in accordance with an address stored in the program counter 11 so as to generate a control code to be supplied to each of the first to fourth operation units 50 to 53. The operation decoder 14 is constructed of a nonerasable device. A correspondence between instruction codes and control codes is determined when the parallel processor chip is manufactured.

Recent developments in LSI technology have made it possible to develop a parallel processor in which a number of operation units are integrated on a single silicon substrate. As the development of parallel processor technology has moved forward, a variety of methods of controlling a parallel processor have been developed in order to improve the utilization factor of the operation units. For example, a super scalar method for issuing instructions dynamically so as to improve the utilization factor of the operation units, and a VLIW (Very Long Instruction Word) method of arranging a plurality of instructions for a plurality of operation units on a long instruction word and performing instruction assignments statically when compiling a program source were developed. On the other hand, the variety of processor utilization technology has been increased, and therefore a number of instructions for a parallel transfer, a conditional operation, an operation with address calculations, and parallel operations based on a word which are used for DSP, for example, are needed.

Such the tendency of the developments is expected to give rise to problems as described below in the coming generation of parallel processors.

(1) an increase in the length of instruction words:

In order to improve the utilization factor of a number of operation units, lengthening the length of instruction words and assigning a number of instructions to each instruction word are needed, like the VLIW method. However, the method has the disadvantage in that it cannot offer the performance if the I/O bandwidth cannot be increased simultaneously so as to be consistent with the increased length of words. Furthermore, with the current state of the art, the I/O transfer rate of prior art parallel processors is becoming saturated, and therefore it is difficult to increase the length of instruction words dramatically.

(2) a restriction of the number of I/O pins:

In order to correct the problem as mentioned in the paragraph (1), an increase in the number of I/O pins is expected to provide an I/O bandwidth required for long instruction words. However, this method is subject to constraints due to a simultaneous switching noise of an output buffer. Furthermore, the number of I/O pins is limited to about 100 to 300 because of an increase in the number of power supply pins used for supplying power to the parallel processor.

(3) deviations in the frequencies of occurrence of instructions:

The provision of a number of instructions gives rise to another problem. The problem is that as the number of instructions is increased, the frequencies of occurrence of instructions are decreased and some instructions which are hardly used come out. FIG. 8 shows a circle graph showing measured frequencies of occurrence of instructions in an SIMD (Single-Instruction Multiple-Data) type parallel processor equipped with 24 operation units which can carry out 256 instructions (the measurement result is obtained by analyzing instructions included in library functions for numerical calculations and image processing). This figure shows that almost half of the instructions are generated with frequencies of occurrence of 0.01% or less. That is, an instruction table is wasted for such instructions which come out rarely. On the other hand, these low-frequency instructions include operations having a high degree of parallel processing, such as parallel transfer, conditional operation, parallel operations based on a word, and operation with address calculations, which contribute to the improvement of the execution speed of a specific program such as a program including all instructions. Therefore, it is difficult to discard such low-frequency instructions.

The prior art parallel processor having the structure as mentioned above has a disadvantage in that since it is necessary to determine a correspondence between instruction codes and control codes at the time of the design of the parallel processor, the correspondence cannot be redefined.

Another disadvantage is that although it is necessary to increase the length of instruction words (i.e. the length of a word stored in the instruction memory 12) in order to define an operation using an arbitrary combination of a plurality of operation units or assign a new function to each of the plurality of operation units, it is difficult to increase the length of instruction words, as previously explained.

Thus, another disadvantage is that as long as a set of instructions the length of which is limited are used, it is difficult to increase the number of instructions and control a number of operation units with efficiency.

SUMMARY OF THE INVENTION

The object of the present invention is to overcome the aforementioned disadvantages. More precisely, it is an object of the present invention to provide a method of increasing the number of instructions for use in a parallel processor and a parallel processor which can provide a plurality of functions (i.e., instructions) even though the length of instruction words is limited.

It is another object of the present invention to provide a method of increasing the number of instructions for use in a parallel processor and a parallel processor which can relax the restriction on the I/O bandwidth by decreasing the length of instruction words substantially, and hence can increase functions which are incorporated on a single silicon substrate.

In accordance with one aspect of the present invention, there is provided a method of increasing a number of instructions for use in a parallel processor, comprising steps of; providing a plurality of operation decoders constructed of a plurality of programmable elements, respectively; and writing a plurality of control codes, which respectively correspond to a plurality of instructions, into the plurality of operation decoders, respectively, in accordance with decode information generated when assembling a source file, thereby executing the plurality of instructions by using a plurality of operation units.

In accordance with a preferred embodiment of the present invention, the method further comprises steps of generating an instruction's name-instruction code correspondence table showing a correspondence between the plurality of instructions and a plurality of predetermined instruction codes, referring to a virtual instruction set showing a correspondence between the plurality of instructions and the plurality of control codes, and the instruction's name-instruction code correspondence table, creating, as the decode information, a decode memory table showing a correspondence between the plurality of predetermined instruction codes and the plurality of control codes, and writing the plurality of control codes into the plurality of operation decoders, respectively.

Preferably, the writing step is performed by using the plurality of predetermined instruction codes as addresses for writing the plurality of control codes into the plurality of operation decoders, respectively.

In accordance with another preferred embodiment of the present invention, the method further comprises steps of providing a redefining instruction of replacing the plurality of control codes written into the operation decoders so as to redefine the plurality of operation decoders, and, when the redefining instruction is executed, writing another set of control codes delivered from outside the parallel processor into the plurality of operation decoders, respectively, in accordance with another decode memory table showing a correspondence between the plurality of predetermined instruction codes and the other set of control codes, the table being created prior to this writing step.

In accordance with another preferred embodiment of the present invention, the method further comprises steps of providing a reprogramming instruction of replacing the plurality of control codes written into the operation decoders so as to reprogram the plurality of operation decoders, and, when the reprogramming instruction is executed, writing another set of control codes, which are stored in the parallel processor prior to this writing step, into the plurality of operation decoders, respectively.

In accordance with another preferred embodiment of the present invention, the method further comprises a step of writing one or more predetermined control codes into one or more ones of the plural operation decoders, respectively, when initializing the parallel processor.

Preferably, the predetermined control codes correspond to instructions with high frequencies of occurrence.

In accordance with another aspect of the present invention, there is provided a parallel processor, comprising: a plurality of operation decoders constructed of a plurality of programmable elements, respectively; a first input port for receiving an address signal input thereto in order to select one of the plurality of operation decoders from outside the parallel processor; and a second input port for receiving a control code input thereto in order to write the control code into one of the plurality of operation decoders from outside the parallel processor in accordance with decode information.

In accordance with a preferred embodiment of the present invention, the plurality of operation decoders are constructed of a random access memory provided with a plurality of address ports each of which receives an address signal delivered thereto via the first input port, a plurality of data input ports each of which receives a control code delivered thereto via the second input port, and a plurality of data output ports each of which delivers a control code to a corresponding operation unit.

In accordance with another preferred embodiment of the present invention, the parallel processor further comprises a redefining register for making a request to replace a plurality of control codes stored in the plurality of operation decoders so as to redefine the plurality of operation decoders.

In accordance with another preferred embodiment of the present invention, the parallel processor further comprises an instruction selecting register which holds an address for selecting one of the plurality of operation decoders according to a predetermined reprogramming instruction, and an instruction defining register which temporarily stores a control code, which is held in the parallel processor according to the reprogramming instruction, in order to write the control code into one of the plurality of operation decoders which is designated by the instruction selecting register.

In accordance with another preferred embodiment of the present invention, the parallel processor further comprises a read only memory which stores one or more predetermined control codes in order to write them into one or more ones of the plurality of operation decoders, respectively, when the parallel processor is initialized.

Further objects and advantages of the present invention will be apparent from the following description of the preferred embodiments of the invention as illustrated in the accompanying drawings.

DETAILED DESCRIPTION OF THE PREFERRED EMBODIMENTS

Next, a description will be made as to an embodiment of the present invention.

Figure 1:
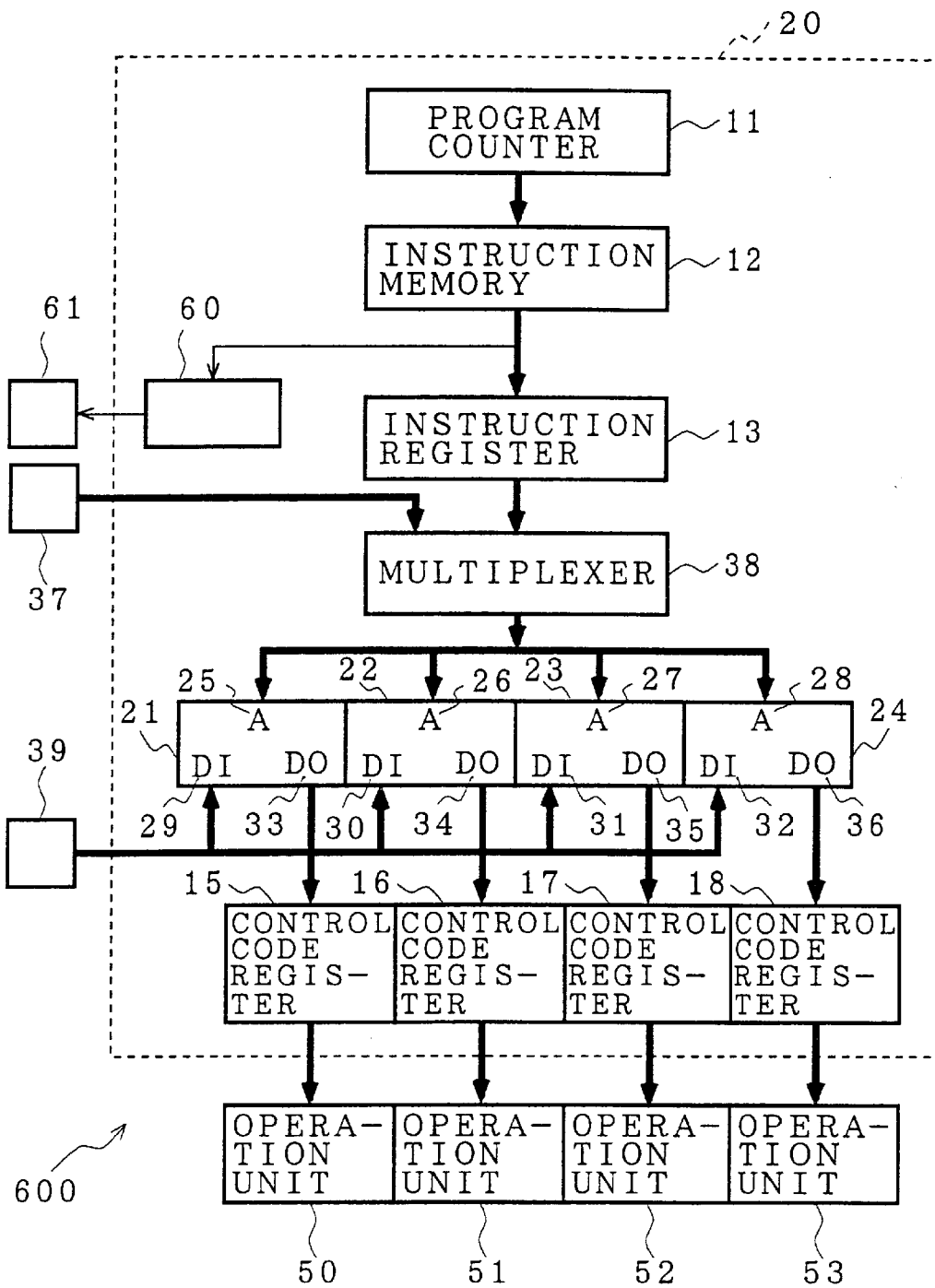
FIG. 1 is a block diagram showing the structure of a main part of a parallel processor in which a method of increasing the number of instructions for use in a parallel processor according to a first embodiment of the present invention is embodied.
Figure 7:
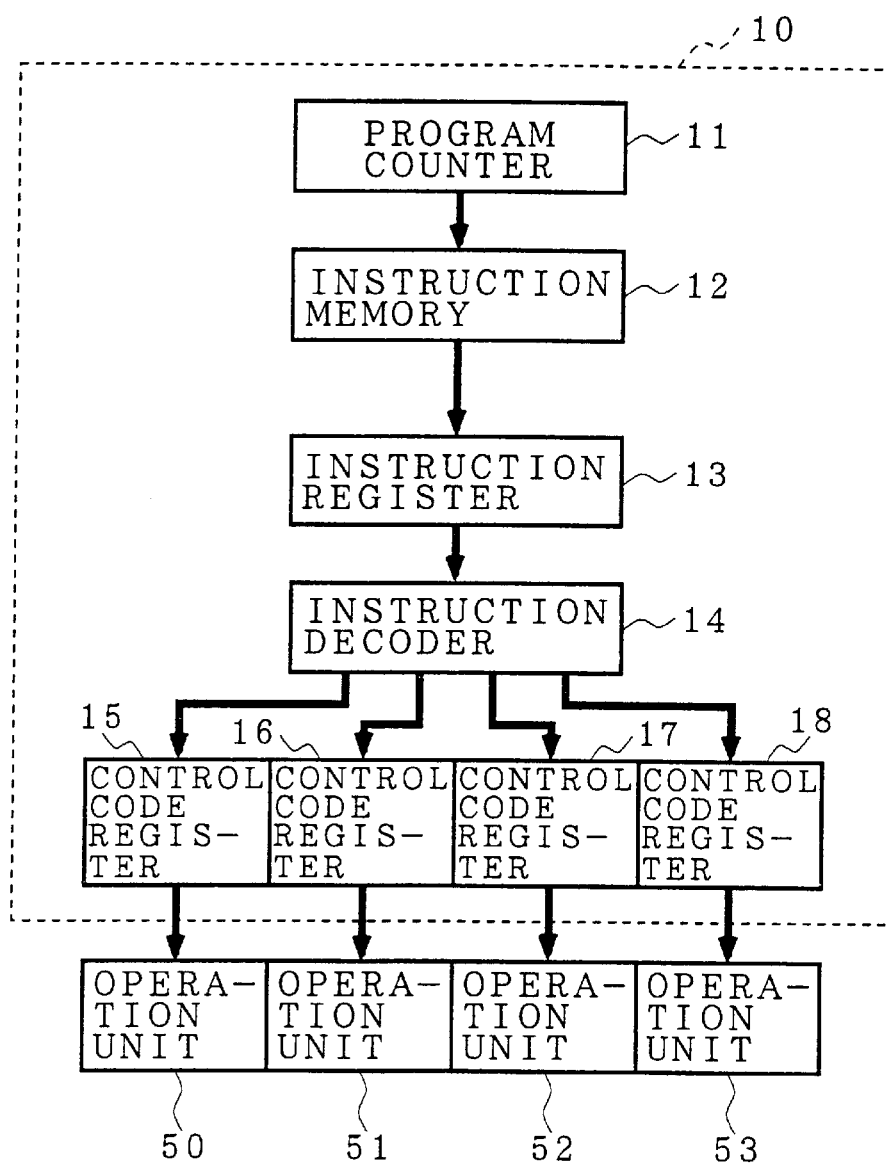
FIG. 7 is a block diagram showing a main part of a prior art parallel processor.
Figure 8:
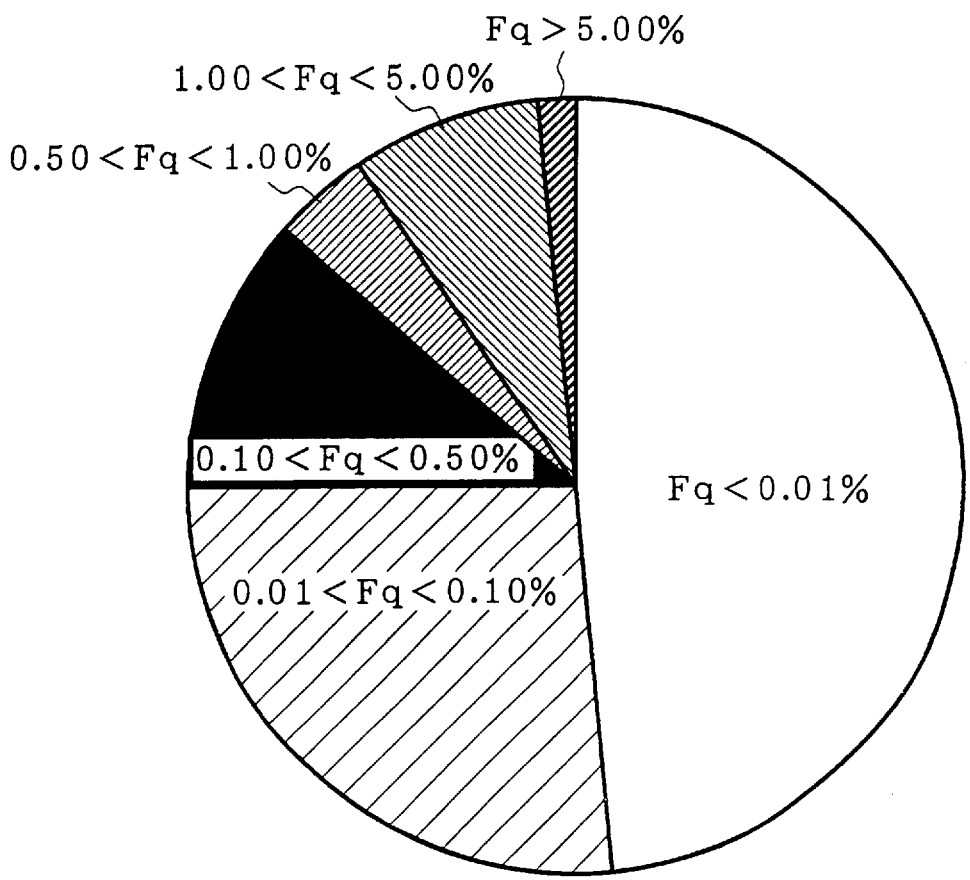
FIG. 8 is a circle graph showing measured frequencies of occurrence of instructions in a SIMD type parallel processor.

Referring now to FIG. 1, it illustrates a block diagram showing the structure of a main part of a parallel processor in which a method of increasing the number of instructions fir use in a parallel processor according to the first embodiment of the present invention is embodied. In the figure, the same components as those shown in FIG. 7 are designated by the same reference numerals and the description about the components will be omitted hereinafter. Furthermore, in FIG. 1, reference numeral 20 denotes a control unit, each of 21 to 24 denotes each memory in a group of decode memories constructed of a random access memory (RAM) having data input ports and data output ports which are separate from the input ports. Each of the decode memories serves as an operation decoder. Reference numerals 25 to 28 denote address ports of the group of decode memories 21 to 24, respectively, 29 to 32 denote data input ports of the group of decode memories 21 to 24, respectively, and 33 to 36 denote data output ports of the group of decode memories 21 to 24, respectively.

Furthermore, reference numeral 37 denotes an addressing port (i.e., a first input port) through which an address signal for showing a specific location where a control code is stored in the group of the decode memories 21 to 24 is input to the control unit 20 from outside the parallel processor 600, 38 denotes a multiplexer for connecting each of the address ports 25 to 28 of the group of decode memories 21 to 24 to the addressing port 37, 39 denotes a data write port (i.e., a second input port) for writing a control code into the group of decode memories 21 to 24 from outside the parallel processor 600, 60 denotes a redefining register which makes a transition, for example, a transition from "0" state to "1" state when the processor makes a redefining request for redefining the group of decode memories 21 to 24 to outside the chip of the parallel processor 600, when the parallel processor reaches a border between two executable files which need a different decode memory table (or a correspondence table showing a correspondence between instruction codes and control codes, i.e., decode information), and 61 denotes a redefining request output port for delivering the redefining request from the redefining register 60 to outside the parallel processor.

As shown in FIG. 1, the address ports 25 to 28 of the group of decode memories 21 to 24 are connected to the instruction register 13 via the multiplexer 38, and the data output ports 33 to 36 are connected to the control code registers 15 to 18, respectively. Therefore, the correspondence between instruction codes and control codes can be defined freely, as will be mentioned bellow.

The method of increasing the number of instructions for use in a parallel processor and parallel processor according to the present invention utilize localization of instructions used in an assembler source file, i.e., the fact that a number of instructions are used with different frequencies of use at all times, and only some of the instructions are used frequently and the frequently used instructions are different in accordance with the types of application programs running in the parallel processor. For example, a floating-point instruction is not used in image processing for each pixel of an image, such as convolution or the like, and a special addressing mode such as bit inversion or the like which is adopted by DSP hardly appears in a code except one for use in signal processing. This characteristic also applies to the VLIW technology of assigning a plurality of functions to a long instruction field. That is, there exists a variety of combinations of instructions which are assigned to the long instruction field and there is a deviation in the frequencies of occurrence of instructions, which depends on the type of program. The method of increasing the number of instructions and parallel processor according to the present invention virtually provide a number of instructions, i.e., functions, with a short word length by assigning control codes of a group of instructions with low frequencies of occurrence to constant instructions codes, respectively, so as to redefine a correspondence between control codes and the predetermined instruction codes, in consideration of such the localization of frequencies of occurrence of instructions.

Figure 2:
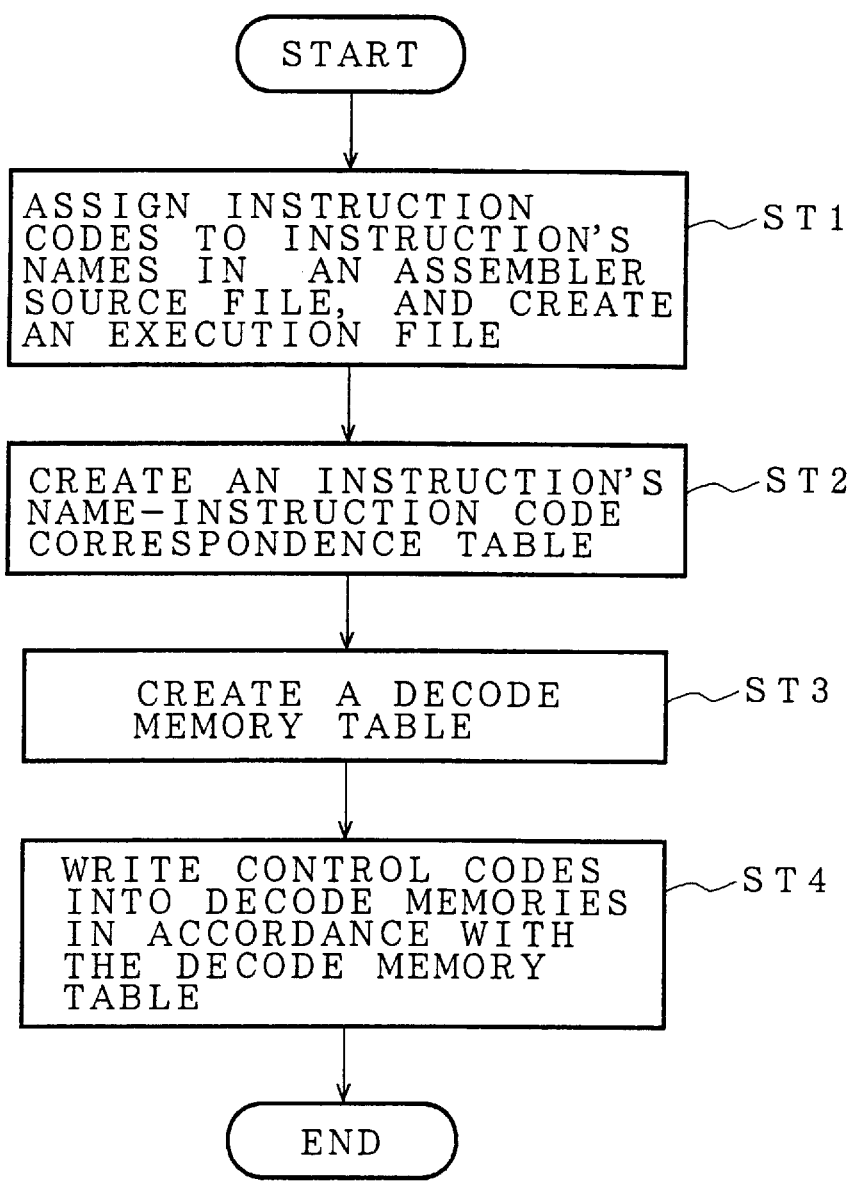
FIG. 2 is a flow diagram generally showing processing by the method of increasing the number of instructions for use in a parallel processor according to the first embodiment of the present invention.
Figure 3:
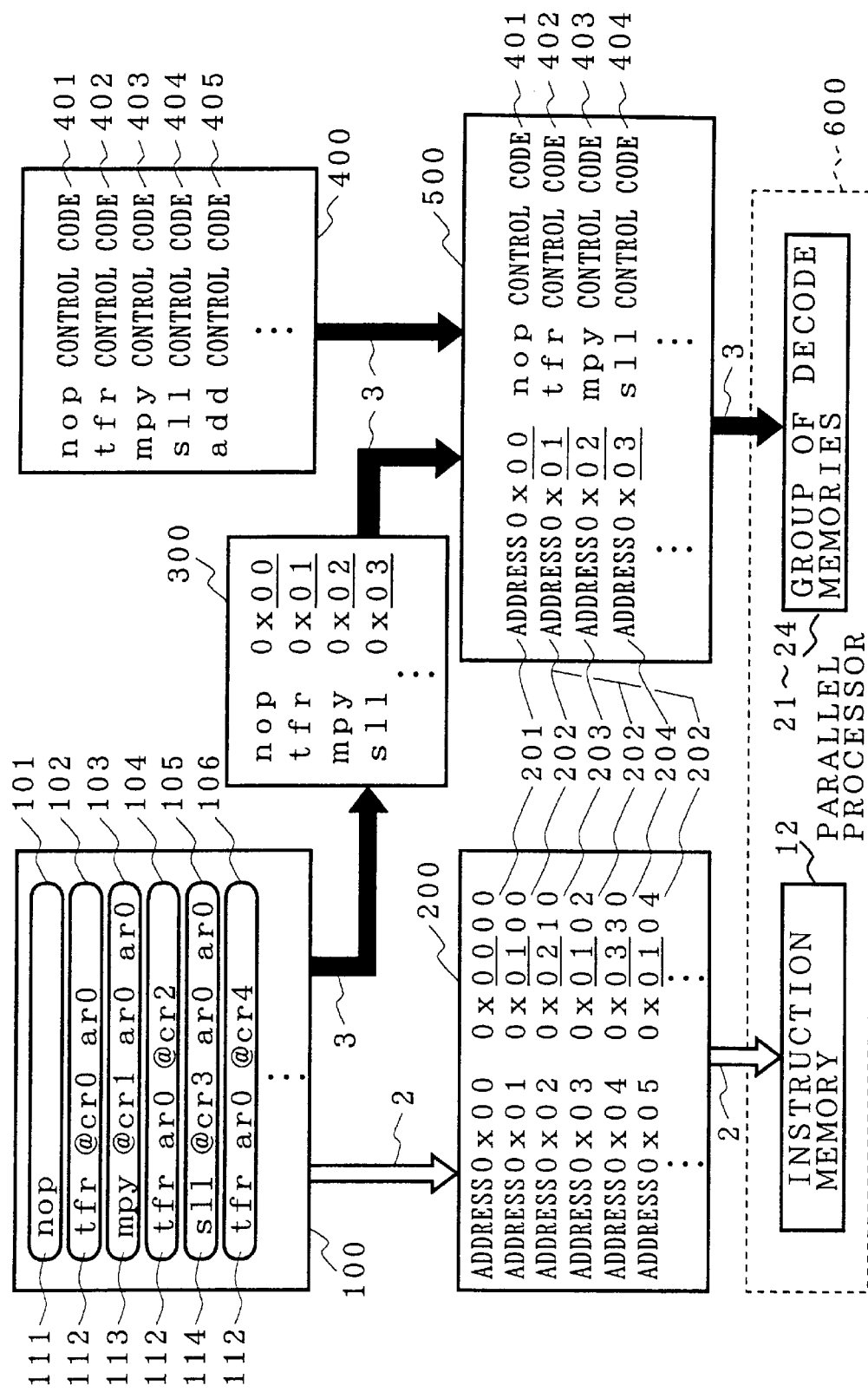
FIG. 3 is a view showing examples of an execution file, an instruction's name-instruction code correspondence table, a decode memory table, and so on, which are generated during the processing by the method of increasing the number of instructions for use in a parallel processor according to the first embodiment of the present invention.

Referring now to FIG. 2, it illustrates a flow diagram generally showing a process of transforming an assembler source file to an execution file form and writing control codes into the group of decode memories 21 to 24 in the method of increasing the number of instructions for use in a parallel processor and parallel processor according to the first embodiment, and FIG. 3 shows examples of an execution file 200, an instruction's name-instruction code correspondence table 300, a decode memory table (decode information) 500, and so on, which are generated according to the flowchart shown in FIG. 2. Hereinafter, the description will be directed to the operation of the method of increasing the number of instructions for use in a parallel processor and parallel processor according to the first embodiment with reference to the figures.

In accordance with the method according to the first embodiment of the present invention, only control codes which correspond to instructions 101 to 106 needed by the assembler source file 100 are selected and the control codes are assigned to the group of decode memories 21 to 24, as will be explained in detail. First, like general assemblers, an instruction-code sequential allocation assembler, which will be mentioned below, in step ST1, generates the execution file 200 from the assembler source file 100 and stores the execution file 200 in the instruction memory 12, by following a path 2 in FIG. 3. When the instruction-code sequential allocation assembler generates the execution file 200, it assigns the instruction codes 201 to 204 to instruction's names 111 to 114 which came out in the assembler source file 100 in the order in which the instructions appeared. In the example shown in FIG. 3, the instruction-code sequential allocation assembler sequentially allocates the instruction's name 111, i.e., "nop (non-execution instruction)" to the instruction code 201, i.e., "00", the instruction's name 112, i.e., "tfr (transfer instruction)" to the instruction code 202, i.e., "01", the instruction's name 113, i.e., "mpy (multiplication instruction)" to the instruction code 203, i.e., "02", and the instruction's name 114, i.e., "sll (shift instruction)" to the instruction code 204, i.e., "03", so as to generate the execution file 200. Thus, the execution file 200 is created in such a manner that the appeared instructions have a one-to-one correspondence with the instruction codes 201 to 204. The instruction codes 201 to 204 are fixed, and therefore the same instruction codes 201 to 204 are used for other decode memory tables. As will be mentioned below, the group of decode memories 21 to 24 can be redefined by different decode memory tables. Right-side parts not underlined of the instruction codes 201 to 204 in the execution file 200 in FIG. 3 are operands used to, for example, set the register.

Next, the description will be made as to a process of generating the decode memory table 500 to be stored in the group of decode memories 21 to 24, and writing the table into the group of decode memories 21 to 24, by following a path 3 shown in FIG. 3. First, in step ST2, the instruction's name-instruction code correspondence table 300 showing a correspondence between the instruction's names 111 to 114 and the instruction codes 201 to 204 respectively assigned to the instruction's name 111 to 114 in the above step ST1 is generated, as shown in FIG. 2. The generation of the instruction's name-instruction code correspondence table 300 can be carried out simultaneously during the generation of the execution file 200 in step ST1.

Next, in step ST3, the decode memory table 500 which is a correspondence table showing a correspondence between the instruction codes and the control codes is generated by using a predetermined correspondence table showing a correspondence between all control codes which are executable physically on the parallel processor 600 and instruction's names, i.e., a virtual instruction set 400, and further referring to the instruction's name-instruction code correspondence table 300. In the example shown in FIG. 3, the control code 401 of "nop" is assigned to the instruction code 201, i.e., "00", the control code 402 of "tfr" is assigned to the instruction code 202, i.e., "01", the control code 403 of "mpy" is assigned to the instruction code 203, i.e., "02", and the control code 404 of "sll" is assigned to the instruction code 204, i.e., "03". That is, the control codes 401 to 404 are associated with the instruction codes 201 to 204, respectively. Then, the group of decode memories 21 to 24 disposed on the parallel processor 600 is initialized by using the above result, in step ST4. That is, the instruction codes 201 to 204 are input as address signals to the address ports 25 to 28 of the group of decode memories 21 to 24 via the addressing port 37 and multiplexer 38, and the corresponding control codes 401 to 404 are written into the group of decode memories 21 to 24 via the data write port 39 and data input ports 29 to 32, respectively. During the operation, the control unit 20 controls the multiplexer 38 so as to sequentially connect the address ports 25 to 28 of the group of decode memories 21 to 24 to the addressing port 37.

As a result, the control codes 401 to 404 corresponding to the instruction codes 201 to 204 within the execution file 200 are respectively applied to the first to fourth operation units 50 to 53 during the operation of the parallel processor 600. Thus, the parallel processor executes the instructions properly, like prior art parallel processors.

Figure 4:
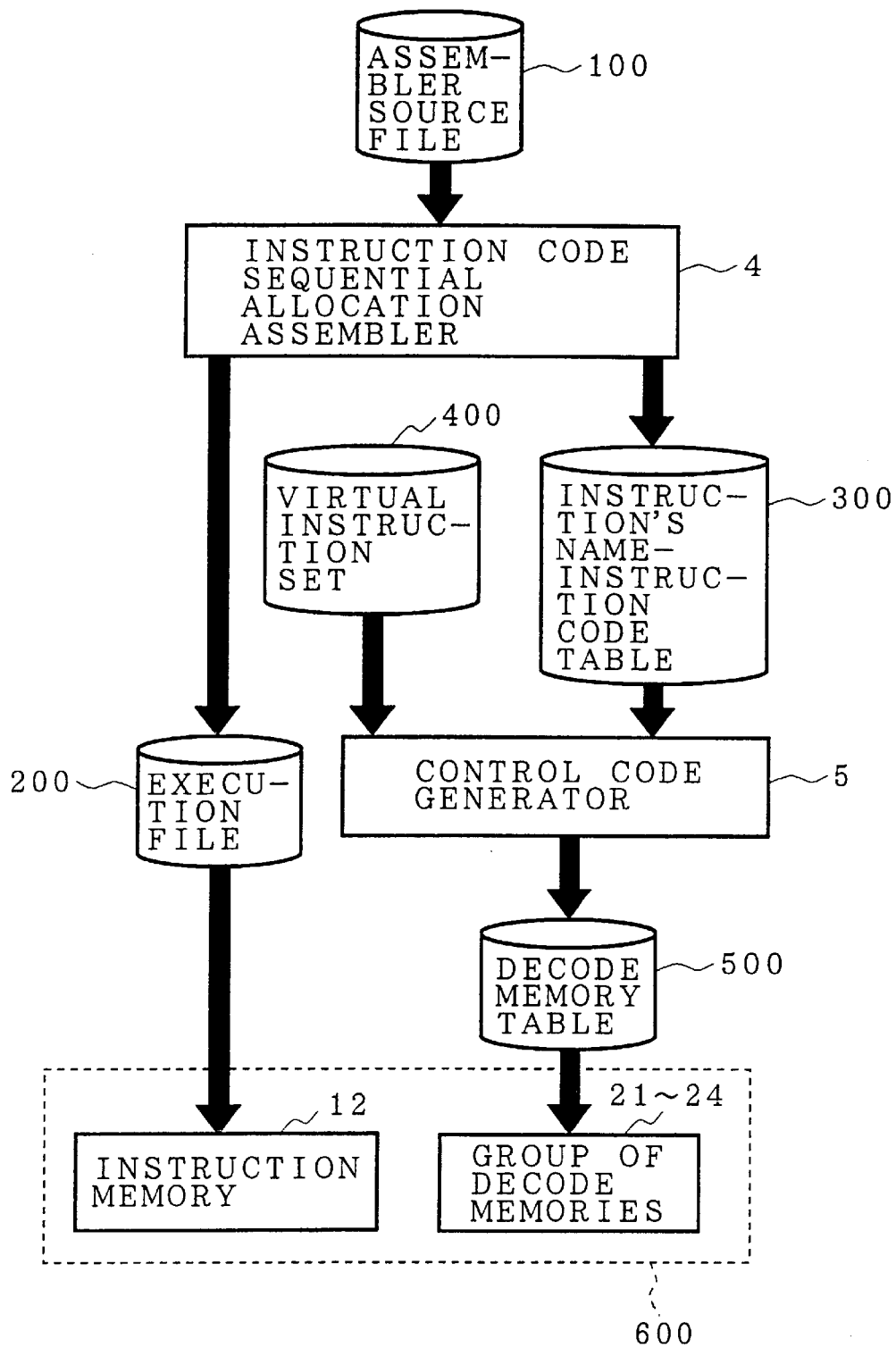
FIG. 4 is a block diagram showing the configuration of software tools which realize the method of increasing the number of instructions for use in a parallel processor according to the first embodiment of the present invention.

Next, the description will be directed to the configuration of indispensable software tools which realize the processes, as shown in FIGS. 2 and 3, of generating the decode memory table 500 and initializing the group of decode memories 21 to 24, and their functions. FIG. 4 shows a block diagram of the configuration of the software tools. In the figure, reference numeral 4 denotes the instruction code sequential allocation assembler, and 5 denotes a control code generator.

The instruction code sequential allocation assembler 4 sequentially allocates the instruction codes 201 to 204 to the instructions 101 to 106 which appear in the input assembler source file 100 as shown in FIG. 3, every time when generating the execution file, unlike prior art assemblers which allocate predetermined instruction codes to corresponding instruction's names. The instruction code sequential allocation assembler 4 writes the result as a series of the instruction codes 201 to 204 into the execution file 200. On the other hand, the instruction code sequential allocation assembler 4 writes allocation information showing which instruction code is allocated to, i.e., is associated with each of the names of the appeared instructions into the instruction's name-instruction code correspondence table 300 showing a correspondence between instruction names and instruction codes. The control code generator 5 finds and writes the control codes which respectively correspond to the instruction codes into the decode memory table 500 by referring to the instruction's name-instruction code correspondence table 300 and virtual instruction set 400 showing a correspondence between all control codes which are executable physically on the parallel processor 600 and instruction's names. Then, the contents of the decode memory table 500 are transferred to the group of decode memories 21 to 24 by the time the instructions start to execute, as mentioned above.

The group of decode memories 21 to 24 is defined only once in the above example. However, there is a case where there exists another set of instructions which is different from the first set of instructions as mentioned above and which needs a different decode memory table, in an execution file 200 generated by separately assembling or by referring to libraries. In this case, when the control unit 20 finds a boundary between the first set of instructions and a new set of instructions, which needs a different decode memory table, the control unit 20 causes the contents of the redefining register 60 to transition to another state, e.g., state "1" in accordance with a redefining instruction written in the instruction memory 12 in order to send a request for a process of redefining the group of decode memories 21 to 24, i.e., rewriting the contents of the group of decode memories 21 to 24, to outside the parallel processor, and then the control unit outputs the redefining request to outside the parallel processor via the redefining request output port 61. In response to the redefining request, a piece of hardware such as an integrated circuit disposed outside the parallel processor 600 writes another decode memory table 500 created in advance into the group of decode memories 21 to 24 via the data write port 39 and data input ports 29 to 32.

As previously mentioned, the first embodiment offers an advantage of being able to virtually realize many instructions the number of which is larger than the number of instructions restricted by the length of instruction words or the address width. As compared with a SIMD type parallel processor as disclosed in "A 1.2-GFLOPS Neural Network Chip Exhibiting Fast Convergence", International Solid-State Conference Digest of Technical Papers, pp. 218–219, (1994) by Yoshkazu Kondo et al., in which the instruction code field is of 8 bits and only 256 types of instructions are provided, the utilization of the method of increasing the number of instructions for use in a parallel processor and parallel processor according to the first embodiment is expected to be able to provide a number of instructions, expandable to 300–500 types of instructions. Furthermore, since it is not necessary for the parallel processor to increase the length of instruction words, it can decrease the length of instruction words substantially, and hence it can increase functions which can be incorporated onto a single silicon substrate by relaxing the restriction on the I/O bandwidth.

Figure 5:
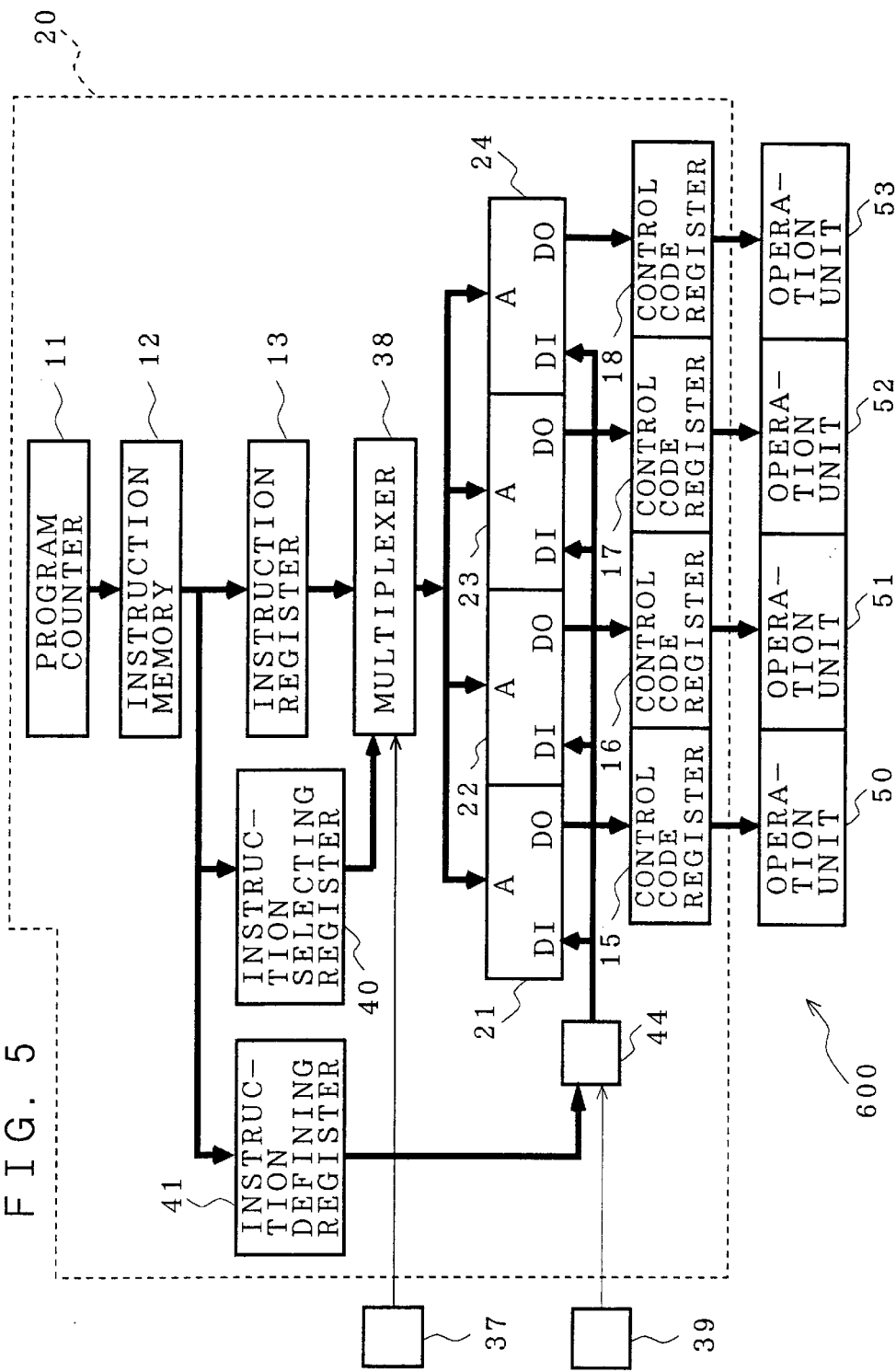
FIG. 5 is a block diagram showing the structure of a main part of a parallel processor in which a method of increasing the number of instructions for use in a parallel processor according to a second embodiment of the present invention is embodied.

Referring now to FIG. 5, it illustrates a block diagram showing the structure of main components of a parallel processor which realizes a method of increasing the number of instructions for use in a parallel processor according to a second embodiment of the present invention. In the figure, the same components as those shown in FIG. 1 are designated by the same reference numerals and the description about the components will be omitted hereinafter. Furthermore, in FIG. 5, reference numeral 40 denotes an instruction selecting register for indicating an instruction code to be redefined, i.e., an instruction code which is associated with a control code to be replaced with another control code, in order to determine which contents of the group of decode memories 21 to 24 are to be reprogrammed, 41 denotes an instruction defining register for temporarily holding new contents (a control code) to be written into the group of decode memories 21 to 24, and 44 denotes a selecting switch for connecting either the output of the instruction defining register 41 or the data write port 39 to the data input ports of the group of decode memories 21 to 24.

In the aforementioned method of increasing the number of instructions for use in a parallel processor and parallel processor according to the first embodiment, the control unit 20 shown in FIG. 1 needs to handle the two types of data, i.e., the execution file 200 and decode memory table 500, for the single assembler source file 100, as can be seen from FIG. 4 showing the structure of the software tools. Furthermore, if the execution file 200 is generated by separately assembling or by referring to libraries, the control unit needs to send a request for reprogramming (or redefining) the group of decode memories 21 to 24 to outside the parallel processor 600 when the control unit reaches a boundary between a section of the execution file and another section of the execution file including another set of instructions, which needs another decode memory table, and to cause the operation of the parallel processor 600 to pause until it completes the reprogramming of the group of decode memories 21 to 24. Such the operation of the control unit reduces the execution speed of a large-scale program which refers to a number of library functions.

In order to solve this problem, according to the method of increasing the number of instructions for use in a parallel processor and parallel processor, an instruction and hardware for reprogramming the group of decode memories 21 to 24, i.e., rewriting the contents of the group of decode memories 21 to 24, are provided so as to carry out and finish a process of reprogramming (or redefining) the group of decode memories 21 to 24 within the execution file 200. To this end, the parallel processor 600 is provided with the instruction selecting register 40 for designating one instruction code to be redefined and instruction defining register 41 for temporarily storing new contents (a control code) to be written into one of the decode memories 21 to 24. The reprogramming instruction which can be included in the execution file 200 and then is stored in the instruction memory 12 has another decode memory table 500 to be written into the group of decode memories 21 to 24 so as to reprogram the decode memories.

Next, a description will be made as to the operation of the parallel processor according to the second embodiment. The instruction selecting register 40 and instruction defining register 41 can realize a function of transferring the contents of another decode memory table 500 preset in the instruction memory 12 to the group of decode memories 21 to 24. There are provided three instructions as follows: an instruction of transferring an address indicating one instruction code to be redefined, i.e., one of the decode memories 21 to 24 which is to be reprogrammed, from the instruction memory 12 to the instruction selecting register 40, an instruction of transferring a new control code from the instruction memory 12 to the instruction defining register 41, and an instruction of reprogramming the above one of the decode memories, i.e., replacing the contents of the one of the decode memories 21 to 24 designated by the address given by the instruction selecting register 40 with the new contents stored in the instruction defining register 41. Repeating the sequential execution of these instructions makes it possible to transfer all the contents of the other decode memory table stored in the instruction memory 12 to the group of decode memories 21 to 24.

As previously explained, the second embodiment of the present invention can offer an advantage of being able to virtually realize many instructions the number of which is larger than the number of instructions restricted by the length of instruction words or the address width, by replacing control codes with low frequencies of occurrence with other control codes, without reducing the execution speed of the parallel processor even when carrying out a large-scale program which refers to a number of library functions.

Figure 6:
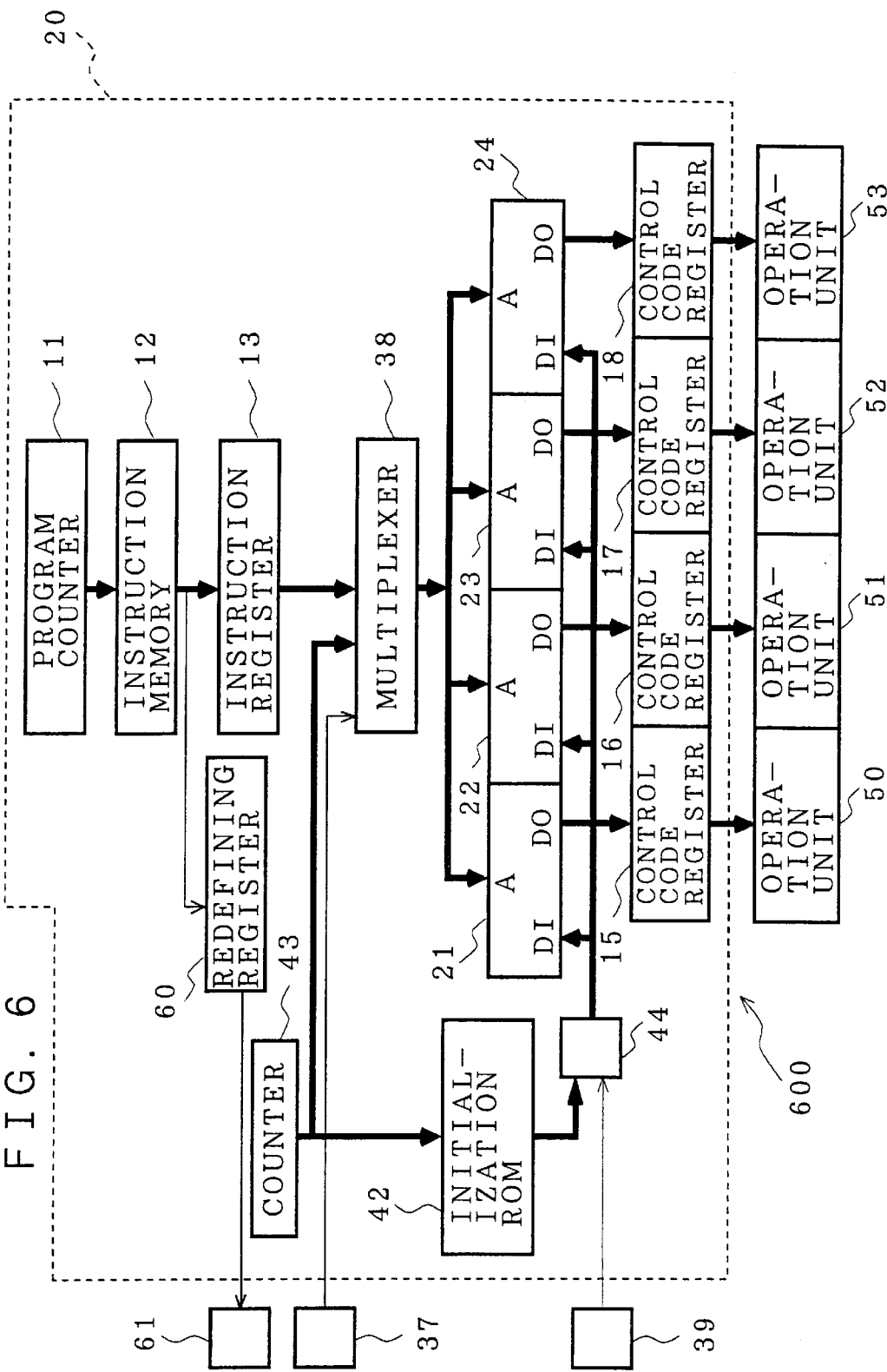
FIG. 6 is a block diagram showing the structure of a main part of a parallel processor in which a method of increasing the number of instructions for use in a parallel processor according to a third embodiment of the present invention is embodied.

Referring now to FIG. 6, it illustrates a block diagram showing the structure of main components of a parallel processor which realizes a method of increasing the number of instructions for use in a parallel processor according to a third embodiment of the present invention. In the figure, the same components as those shown in FIG. 1 are designated by the same reference numerals and the description about the components will be omitted hereinafter. Furthermore, in FIG. 6, reference numeral 42 denotes an initialization ROM (read only memory) for storing at least one control code which corresponds to an instruction with a high frequency of occurrence, and 43 denotes a counter for indicating an address identifying a specific where a control code is stored in the initialization ROM 42 and also identifying a specific location where the control code is to be stored in the group of decode memories 21 to 24.

The internal data transfer rate within a general LSI is a few times as high as external transfer rates of data transferred from or to the LSI to or from outside the LSI. Therefore, the amount of transfers of control codes from outside the parallel processor 600 can be reduced and the starting of instructions can be speeded by placing, on the parallel processor 600, a function of partially initializing the group of decode memories 21 to 24 to allocate at least one control code with a high frequency of occurrence, such as a data transfer instruction, or the instruction for reprogramming the decode memories as mentioned in the above second embodiment, to at least one of the decode memories. In the method of increasing the number of instructions for use in a parallel processor and parallel processor according to the third embodiment, such the control code initialization function is realized by the initialization ROM 42 and counter 43.

Next, a description will be directed to the operation of the parallel processor according to the third embodiment. When the parallel processor 600 is initialized, one or more control codes stored in the initialization ROM 42 are transferred to the group of decode memories 21 to 24 once while the counter 43 is incremented. As a result, the group of decode memories 21 to 24 is partially initialized once at that time. Then, control codes with low frequencies of occurrence are written into a remaining part of the group of decode memories 21 to 24 by using the same method as the first embodiment mentioned above. Furthermore, when necessary, the parallel processor causes the contents of the redefining register 60 to make a transition to another state, e.g., "1" state in order to make a request for reprogramming the remaining part of the group of decode memories 21 to 24. Instead of reprogramming only a part of the group of decode memories 21 to 24, all the decode memories can be reprogrammed. However, in this case, it is difficult to allocate control codes which correspond to instructions with high frequencies of occurrence to the group of decode memories 21 to 24 with priority and at a high speed.

As previously mentioned, the third embodiment of the present invention can offer an advantage of being able to virtually realize many instructions the number of which is larger than the number of instructions restricted by the length of instruction words or the address width. Furthermore, this embodiment can offer an advantage of reserving a control code transfer from outside the parallel computer for only instructions with low frequencies of occurrence and allocating at least one control code associated with an instruction with a high frequency of occurrence to the group of decode memories 21 to 24 at a higher speed.

Instead of the redefining register 60, the instruction selecting register 40 and instruction defining register 41 according to the second embodiment mentioned above can be provided. It is needless to say that the same advantage as that offered by the second embodiment can be provided in this case.

In the above first, second, or third embodiment of the present invention, the parallel processor 600 is provided with the four decode memories 21 to 24 and four operation units 50 to 53, the numbers of the decode memory cells and operation units are not limited to these numbers.

As previously mentioned, the present invention offers the following advantages.

In accordance with a preferred embodiment, there is provided a method of increasing the number of instructions for use in a parallel processor, comprising the steps of providing a plurality of operation decoders constructed of a programmable element, and writing a plurality of control codes, which respectively correspond to a plurality of instructions, into the plurality of operation decoders in accordance with decode information generated when assembling a source file. Therefore, the embodiment offers the advantage of being able to virtually realize many instructions, the number of which is larger than the number of instructions restricted by the length of instruction words or the address width. Furthermore, using the method can decrease the length of instruction words substantially, and hence it can increase functions which can be incorporated into a single silicon substrate by relaxing the restriction on the I/O bandwidth.

In accordance with a preferred embodiment of the present invention, the method of increasing the number of instructions for use in parallel processors comprises the steps of referring to a virtual instruction set showing a correspondence between the plurality of instructions and the plurality of control codes, and an instruction's name-instruction code correspondence table, creating a decode memory table showing a correspondence between a plurality of predetermined instruction codes and the plurality of control codes, and writing the plurality of control codes into the plurality of operation decoders, respectively. Therefore, the embodiment offers the advantage of being able to virtually realize many instructions the number of which is larger than the number of instructions restricted by the length of instruction words or the address width.

In accordance with a preferred embodiment of the present invention, the above writing step is performed by using the plurality of predetermined instruction codes as addresses for writing the plurality of control codes into the plurality of operation decoders, respectively. Therefore, the embodiment offers the advantage of being able to easily write the control codes into the operation decoders. Furthermore, the embodiment offers the advantage of being able to virtually realize many instructions the number of which is larger than the number of instructions restricted by the length of instruction words or the address width.

In accordance with another preferred embodiment of the present invention, the method further comprises the steps of providing a redefining instruction of replacing the plurality of control codes written into the operation decoders so as to redefine the plurality of operation decoders, and, when the redefining instruction is executed, writing another set of control codes delivered from outside the parallel processor into the plurality of operation decoders, respectively, in accordance with another decode memory table showing a correspondence between the plurality of predetermined instruction codes and the other set of control codes, the table being created prior to this writing step. Therefore, the embodiment offers the advantage of being able to virtually realize many instructions the number of which is larger than the number of instructions restricted by the length of instruction words or the address width. Furthermore, the embodiment offers the advantage of being able to rewrite the contents of the operation decoders in accordance with another set of instructions in an execution file generated by separately assembling or by referring to libraries.

In accordance with a preferred embodiment of the present invention, the method further comprises the steps of providing a reprogramming instruction of replacing the plurality of control codes written into the operation decoders so as to reprogram the plurality of operation decoders, and, when the reprogramming instruction is executed, writing another set of control codes, which are stored in the parallel processor prior to this writing step, into the plurality of operation decoders, respectively. Therefore, the embodiment offers the advantage of being able to virtually realize many instructions the number of which is larger than the number of instructions restricted by the length of instruction words or the address width. Furthermore, the embodiment offers the advantage of being able to rewrite the contents of the operation decoders in accordance with another set of instructions in an execution file generated by separately assembling or by referring to libraries, without having to cause the parallel processor to pause.

In accordance with a preferred embodiment of the present invention, the method further comprises the step of writing one or more predetermined control codes into one or more ones of the plural operation decoders, respectively, when initializing the parallel processor. Therefore, the embodiment can offer an advantage of reserving a control code transfer for only instructions such as instructions with low frequencies of occurrence and allocating at least one control code associated with a specific instruction to the operation decoders at a higher speed. Preferably, the predetermined control codes are associated with instructions with high frequencies of occurrence. Therefore, this variant can offer an advantage of reserving a control code transfer for only instructions such as instructions with low frequencies of occurrence and allocating at least one control code associated with an instruction with a high frequency of occurrence to the operation decoders at a higher speed.

In accordance with a preferred embodiment of the present invention, there is provided a parallel processor, comprising:

a plurality of operation decoders constructed of a plurality of programmable elements, respectively; a first input port for receiving an address signal input thereto in order to select one of the plurality of operation decoders from outside the parallel processor; and a second input port for receiving a control code input thereto in order to write the control code into one of the plurality of operation decoders from outside the parallel processor in accordance with decode information. Therefore, the embodiment offers the advantage of being able to virtually realize many instructions the number of which is larger than the number of instructions restricted by the length of instruction words or the address width. Furthermore, using the method can decrease the length of instruction words substantially, and hence it can increase functions which can be incorporated into a single silicon substrate by relaxing the restriction on the I/O bandwidth.

In accordance with a preferred embodiment of the present invention, the plurality of operation decoders are constructed of a random access memory provided with a plurality of address ports each of which receives an address signal delivered thereto via the first input port, a plurality of data input ports each of which receives a control code delivered thereto via the second input port, and a plurality of data output ports each of which delivers a control code to a corresponding operation unit. Therefore, the embodiment offers the advantage of being able to virtually realize many instructions the number of which is larger than the number of instructions restricted by the length of instruction words or the address width.

In accordance with another preferred embodiment of the present invention, the parallel processor further comprises a redefining register for making a request to replace a plurality of control codes stored in the plurality of operation decoders so as to redefine the plurality of operation decoders. Therefore, the embodiment offers the advantage of being able to rewrite the contents of the operation decoders in accordance with another set of instructions in an execution file generated by separately assembling or by referring to libraries.

In accordance with another preferred embodiment of the present invention, the parallel processor further comprises an instruction selecting register which holds an address for selecting one of the plurality of operation decoders according to a reprogramming instruction, and an instruction defining register which temporarily stores a control code, which is held in the parallel processor according to the reprogramming instruction, in order to write the control code into one of the plurality of operation decoders which is designated by the instruction selecting register. Therefore, the embodiment offers the advantage of being able to rewrite the contents of the operation decoders in accordance with another set of instructions in an execution file generated by separately assembling or by referring to libraries, without having to cause the parallel processor to pause.

In accordance with another preferred embodiment of the present invention, the parallel processor further comprises a read only memory which stores one or more predetermined control codes in order to write them into one or more ones of the plurality of operation decoders, respectively, when the parallel processor is initialized Therefore, the embodiment can offer an advantage of reserving a control code transfer for only instructions such as instructions with low frequencies of occurrence and allocating at least one control code associated with a specific instruction to the operation decoders at a higher speed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of increasing a number of instructions for use in a parallel processor, comprising steps of;

providing a plurality of operation decoders constructed of a plurality of programmable elements, respectively; and writing a plurality of control codes, which respectively correspond to a plurality of instructions, into said plurality of operation decoders, respectively, in accordance with decode information generated when assembling a source file, thereby executing said plurality of instructions by using a plurality of operation units.

2. The method of increasing a number of instructions for use in a parallel processor according to claim 1, further comprising steps of generating an instruction's name-instruction code correspondence table showing a correspondence between said plurality of instructions and a plurality of predetermined instruction codes; referring to a virtual instruction set showing a correspondence between said plurality of instructions and said plurality of control codes, and said instruction's name-instruction code correspondence table; creating, as said decode information, a decode memory table showing a correspondence between said plurality of predetermined instruction codes and said plurality of control codes; and writing said plurality of control codes into said plurality of operation decoders, respectively.

3. The method of increasing a number of instructions for use in a parallel processor according to claim 2, wherein said writing step is performed by using said plurality of predetermined instruction codes as addresses for writing said plurality of control codes into said plurality of operation decoders, respectively.

4. The method of increasing a number of instructions for use in a parallel processor according to claim 2, further comprising steps of providing a redefining instruction of replacing said plurality of control codes written into said operation decoders so as to redefine said plurality of operation decoders, and, when said redefining instruction is executed, writing another set of control codes delivered from outside the parallel processor into said plurality of operation decoders, respectively, in accordance with another decode memory table showing a correspondence between said plurality of predetermined instruction codes and said other set of control codes, said table being created prior to this writing step.

5. The method of increasing a number of instructions for use in a parallel processor according to claim 1, further comprising steps of providing a reprogramming instruction of replacing said plurality of control codes written into said operation decoders so as to reprogram said plurality of operation decoders, and, when said reprogramming instruction is executed, writing another set of control codes, which are stored in said parallel processor prior to this writing step, into said plurality of operation decoders, respectively.

6. The method of increasing a number of instructions for use in a parallel processor according to claim 1, further comprising a step of writing one or more predetermined control codes into one or more ones of said plural operation decoders, respectively, when initializing said parallel processor.

7. The method of increasing a number of instructions for use in a parallel processor according to claim 6, wherein said predetermined control codes are associated with instructions with high frequencies of occurrence.

8. A parallel processor, comprising:

a plurality of operation decoders constructed of a plurality of programmable elements, respectively;

a first input port for receiving an address signal input thereto in order to select one of said plurality of operation decoders from outside the parallel processor; and a second input port for receiving a control code input thereto in order to write said control code into one of said plurality of operation decoders from outside the parallel processor in accordance with decode information.

9. The parallel processor according to claim 8, wherein said plurality of operation decoders are constructed of a random access memory provided with a plurality of address ports each of which receives an address signal delivered thereto via said first input port, a plurality of data input ports each of which receives a control code delivered thereto via said second input port, and a plurality of data output ports each of which delivers a control code to a corresponding operation unit.

10. The parallel processor according to claim 8, further comprising a redefining register for making a request to replace a plurality of control codes stored in said plurality of operation decoders so as to redefine said plurality of operation decoders.

11. The parallel processor according to claim 8, further comprising an instruction selecting register which holds an address for selecting one of said plurality of operation decoders according to a predetermined reprogramming instruction, and an instruction defining register which temporarily stores a control code, which is held in the parallel processor according to said reprogramming instruction, in order to write the control code into one of said plurality of operation decoders which is designated by said instruction selecting register.

12. The parallel processor according to claim 8, further comprising a read only memory which stores one or more predetermined control codes in order to write them into one or more ones of said plurality of operation decoders, respectively, when the parallel processor is initialized.

* * * * *